(12) United States Patent
Born

(10) Patent No.: US 6,381,198 B1
(45) Date of Patent: Apr. 30, 2002

(54) CLOCKWORK MOVEMENT FITTED WITH A GENERATOR

(75) Inventor: Jean-Jacques Born, Morges (CH)

(73) Assignee: Asulab S.A., Bienne (CH)

( * ) Notice: Subject to any disclaimer, the term of this patent is extended or adjusted under 35 U.S.C. 154(b) by 9 days.

(21) Appl. No.: 09/715,012

(22) Filed: Nov. 20, 2000

(30) Foreign Application Priority Data

Dec. 7, 1999 (EP) .............................................. 99124389

(51) Int. Cl.⁷ .............................. G04F 5/00; G06F 1/04; H02K 21/12
(52) U.S. Cl. ................. 368/157; 310/40 R; 310/156.01
(58) Field of Search ............................ 368/76, 80, 157, 368/160; 310/40 R, 46, 49 R, 156.01, 254

(56) References Cited

U.S. PATENT DOCUMENTS 4,795,930 A * 1/1989 Schwartz et al. ......... 310/49 R
5,059,840 A * 10/1991 Plancon .................... 310/49 R

FOREIGN PATENT DOCUMENTS

| EP | 751445 | 1/1997 |
|----|--------|--------|
| EP | 905587 | 3/1999 |

* cited by examiner

*Primary Examiner*—Vit Miska
(74) *Attorney, Agent, or Firm*—Sughrue Mion, PLLC

(57) ABSTRACT

Clockwork movement fitted with a generator powering the circuit for regulating the rotation of the generator rotor. This generator is formed of at least one coil (11a, 11b, 11c) placed between magnets respectively secured to two flanges (8) mounted at the ends of a shaft of the rotor (5). The coils are arranged on a substrate (6) one part of which, carrying at least one coil, includes means allowing said coil to be moved relative to the rotor. There is also provided a device for adjusting and memorising the position of said stator part (1, 15). The adjustment of the position of said stator part allows the amplitude of the induced voltage across the terminals of the coils (11) to be adjusted.

7 Claims, 3 Drawing Sheets

Fig. 3
Fig. 4
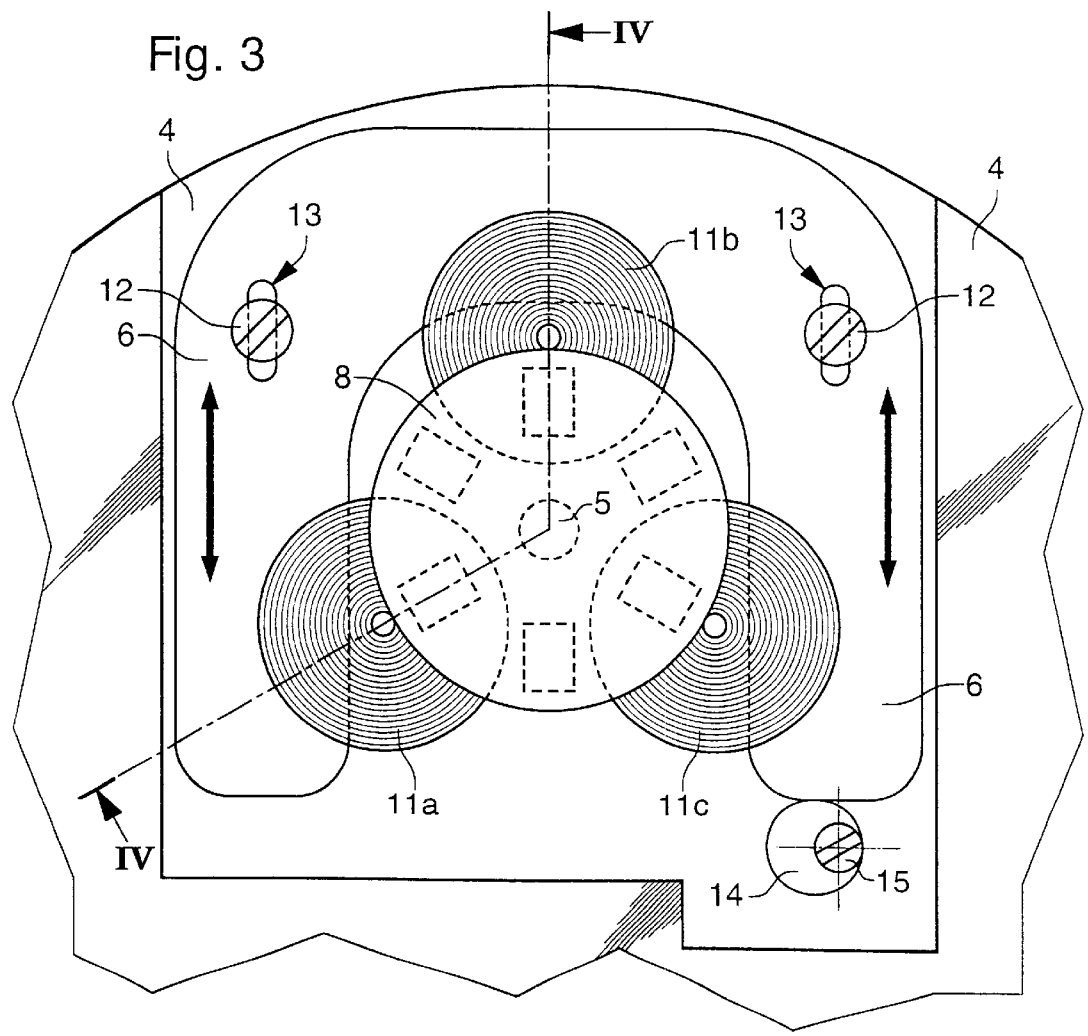
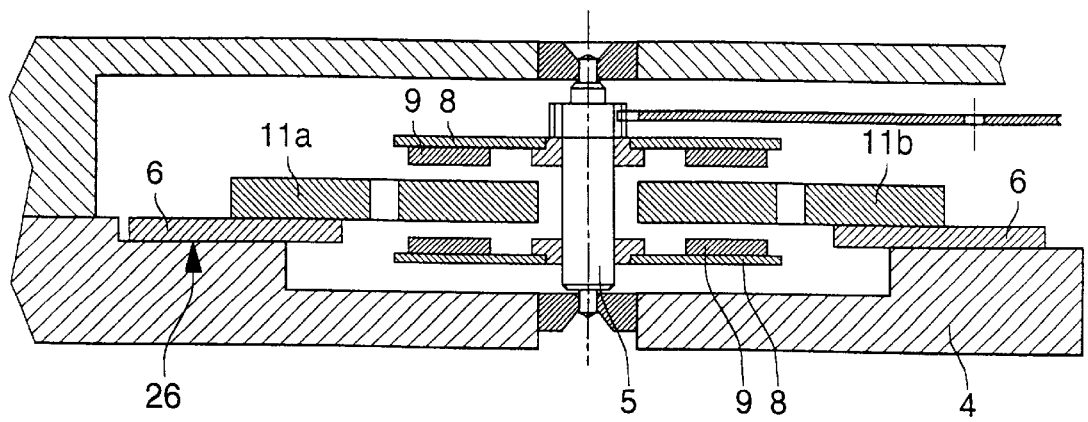

CLOCKWORK MOVEMENT FITTED WITH A GENERATOR

BACKGROUND OF THE INVENTION

The use of batteries or accumulators is a factor which limit the features of the apparatus, for all applications, and in particular for a watch. Indeed, changing or recharging the batteries or accumulators affects the availability and reliability of the watch.

In this context, the conventional mechanical watch has a certain advantage in watchmaking know-how: such a watch is permanently available. The recharge of power—which is purely mechanical—is achieved simply by rewinding the watch mechanism.

This type of watch uses a manual or automatic winding device generally coupled to a regulating device commonly called a "Swiss lever escapement". It is difficult to obtain a high level of precision with this regulating device. This system is also relatively expensive.

The other large family concerns the conventional quartz watch. A battery simultaneously powers an electric motor and a device for regulating the working of the motor. The motor rotation is driven/controlled by a nominal frequency supplied by a quartz. This provides a high level of precision for the time indication. However, this device is relatively noisy since the forward movement of the second wheel is intermittent and the battery has to be changed periodically.

New types of watch have been made combining the two aforecited systems and exploiting their respective advantages. In these constructions, mechanical power storage has been associated with quartz regulation, supplied with electric power by a generator driven by a mechanical part coupled with a power storage spring.

The article by M M Born, Dinger and Farine "Salto—An automatically wound mechanical movement with the precision of a quartz movement" which appeared in the Swiss Chronometry Society publication "SSC study days 1997", pages 55 to 63 may also be cited as the corresponding state of the art.

The arrangement of the generator according to this prior art is illustrated in FIG. 1 annexed hereto, showing a top view of a partially assembled clockwork movement, and in FIG. 2 annexed hereto, which is a transverse cross-section of FIG. 1. This generator includes a rotor with two flanges 8 arranged on either side of three flat coils 11 forming the stator and offset by 120° with respect to each other relative to the rotor axis, in the same orthogonal plane as the latter.

Six magnets 9 are fixed radially and at regular intervals on each flange 8, facing coils 11. Two consecutive or facing magnets 9 have opposite polarity. A printed circuit 6 is secured to plate 4 and is used as a support for coils 11.

Electric circuit 10, which has a low power consumption, is powered by an electric generator—formed by the shaft assembly of rotor 5, flanges 8, magnets 9 and coils 11—driven via the kinematic connection 3 by barrel device 2. The mechanical power stored in barrel 2 thus drives the rotor. The passage of magnets 9 in proximity to coils 11 generates a substantially sinusoidal induced voltage at the terminals of coils 11.

The voltage supplied by a coil 11 is substantially sinusoidal. The operation of the regulation device requires a rectified voltage. The voltage across the terminals of coils 11 used to supply the electronic regulation circuit 10 passes through an electrical rectifier circuit. The voltage then passes through an amplifier step which for example quadruples the output voltage of the rectifier.

Since clockwork movements are generally of small size, inevitable manufacturing and mounting imprecision affects the stability of the output voltage of the rectifier circuit. The amplifier step amplifies the voltage variations in the same order of magnitude. In order to obtain a rectified voltage sufficient for all the movements with a generator of one series, a significant margin of error is therefore kept by increasing the minimum value provided for the rectified voltage.

The higher the margin of error on the rectified voltage, the higher the minimum voltage has to be for normal operation, which results in a higher electrical power consumption in the regulation circuit and a decrease in the autonomy of the watch between two winding operations of the barrel mechanism 2.

The object of the invention is to overcome this drawback. The invention therefore concerns a clockwork movement fitted with a generator formed of a rotor including two flanges connected by a shaft, magnets being fixed to each flange in even numbers—two consecutive or facing magnets having opposite polarity. This generator further includes a stator including one or a plurality of coils with axes parallel to that of the rotor, this coil or this plurality of coils being introduced between the two flanges fitted with magnets and being supported by a substrate. This movement is characterized in that at least one part of the stator including said coil or at least one coil of said plurality is fitted with means allowing it to be moved so as to make its position adjustable relative to the rotor in a plane perpendicular to the shaft of said rotor, so as to adjust the amplitude of the induced voltage across the terminals of said coil or at least one coil of said plurality when the rotor rotates.

The support substrate of the coil(s) can be made either in a single piece or in several and can include oblong drillings which are longitudinal or in an arc of circle and which act as guides for the adjustment.

An eccentric stop device advantageously allows the adjustment of the voltage across the coil or coils to be adjusted and the disposition of the coils to be memorised in the event the generator is dismantled.

The invention will be understood and other advantages will appear from the following description of non limiting embodiment examples made with reference to the annexed schematic drawings in which:

BRIEF DESCRIPTION OF THE DRAWING

FIG. 3 is a top view and

FIG. 4 is cross-section, of a first embodiment of the clockwork movement fitted with a generator according to the invention including three coils secured to a monobloc substrate;

Figure 1:
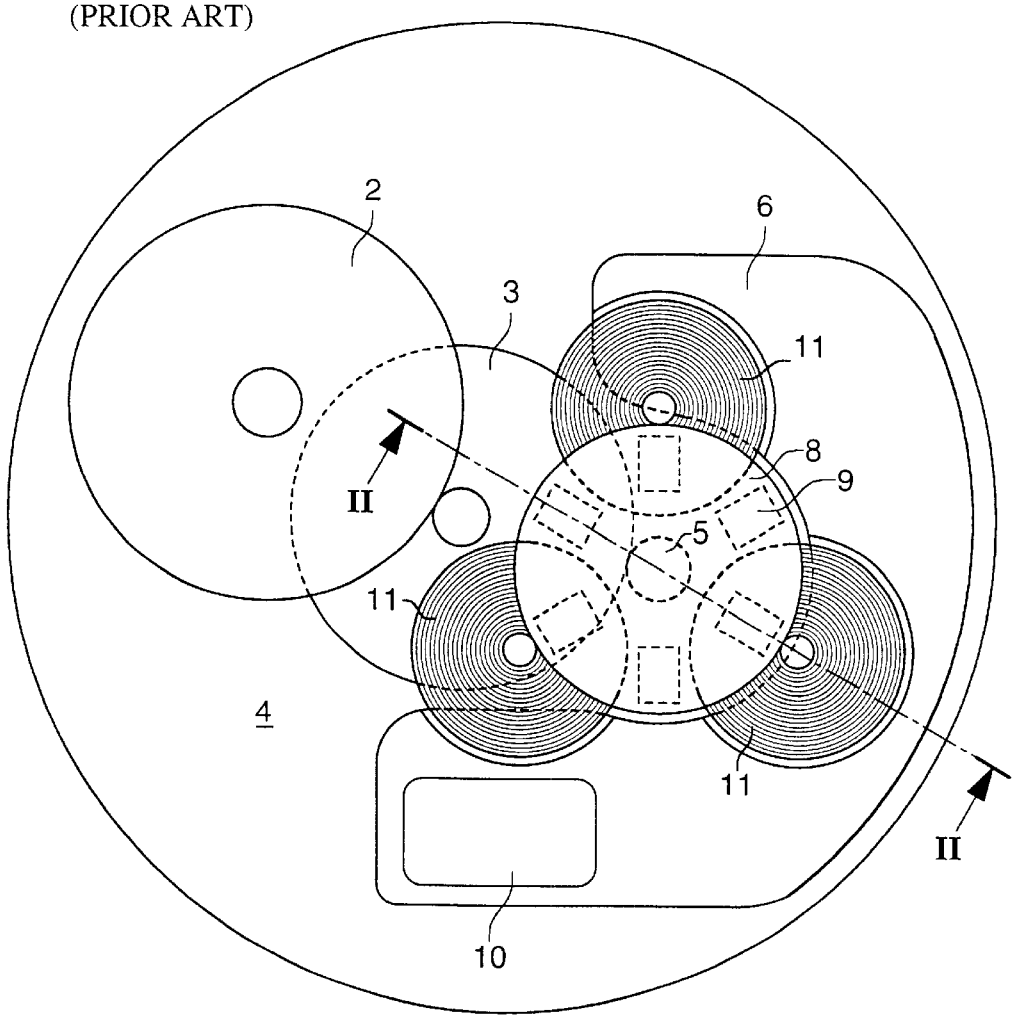
FIGS. 1 and 2 show a generator according to the prior art.
Figure 2:
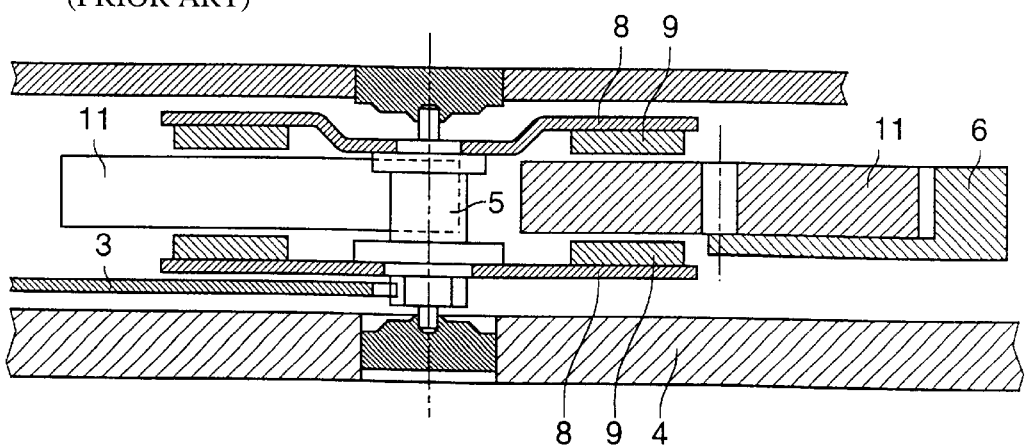

The construction reproduce in identical manner the following elements examined in the prior art: the body of the watch 4 the magnets 9, the flanges 8, the electronic circuit 10, the rotor shaft 5 and stator coils 11a, 11b, and 11c.

The two following embodiments are based on a same concept wherein the stator is at least partially movable relative to the rotor to allow adjustment of the voltage supplied by the coils 11a, 11b, and 11c to be effected. In both cases, substrate 6 is secured to the coils and at least one part of substrate 6, carrying at least one coil is movable relative to rotor 4 which is rotatably mounted in watch body 4.

The amplitude of the induced voltage supplied by these coils is modified when the relative position of at least one of the coils 11a, 11b and/or 11c is modified. In each example a stator formed of three flat cylindrical coils is used. Substrate 6 includes a printed circuit and supports an electronic regulation circuit 10.

A first embodiment shown in FIGS. 3 and 4 includes a monobloc substrate 6 supporting the three coils 11a, 11b, and 11c.

Two oblong and rectilinear holes 13 are provided in substrate 6. The longitudinal axes of holes 13 are parallel. Two screws 12 pass through holes 13 and are screwed into a threading of watch body 4. The adjustment of the position of the stator is possible as soon as the tightening of screws 12 is sufficiently loose to allow a relative movement between body 4 and substrate 6 which is arranged in a recess 26 of body 4.

It will be noted that it is envisaged in a variant to provide holes 13 with a width larger than the diameter of screws 12 at the level of these holes 13 so as to also allow a fine adjustment of the position of substrate 6 along a direction perpendicular to the longitudinal axes of holes 13.

A cylindrical roller 14 rotatably mounted about an off centre axis defined by screw 15 and pressing against substrate 6 also allows a better control of the adjustment the induced voltage and a memorisation of this adjustment to be obtained. The device facilitates the assembling of the system in the event of a dismantling operation required by any maintenance works, since it avoids an operator having to readjust the voltage.

In a preferred variant, roller 14 is secured to screw 15. Screw 15 is implanted in body 4 so as to allow contact between roller 14 and a lateral face of support 16, preferably perpendicular to longitudinal axes of oblong holes 13. The rotation of screw 15 drives thus roller 14 and the distance between screw 15 and support 16 is thus modified.

As a result this stop device allows the position of the stator to be adjusted simply by rotating screw 15, the operating position thus memorised remaining unchanged in the absence of any new manipulation of screw 15.

Figure 5:
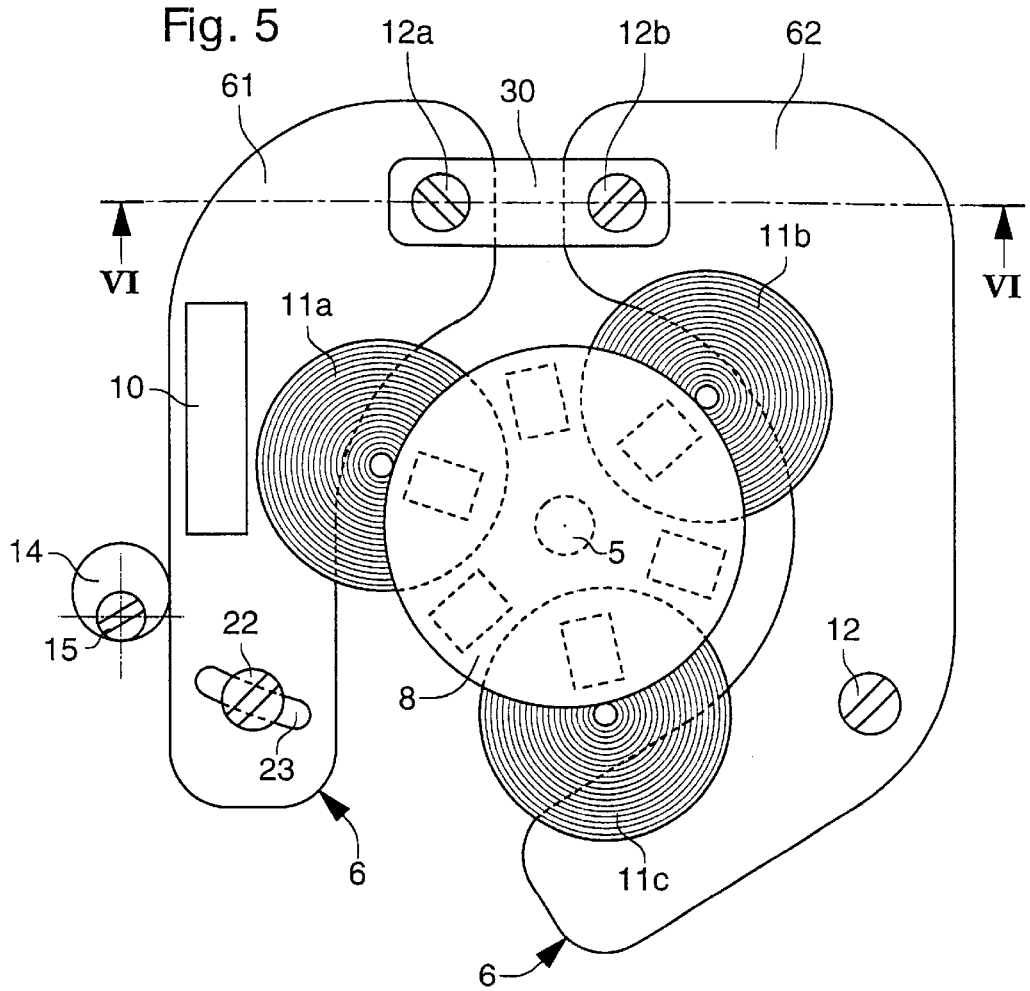
FIG. 5 is a top view.
Figure 6:
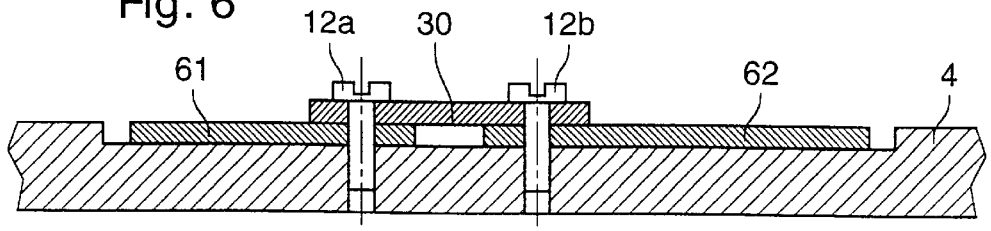
FIG. 6 is cross-section, of a second embodiment including an assembly formed of a two part substrate of which the part carrying a coil has an adjustment which pivots relative to the body of the watch.
Figure 7:
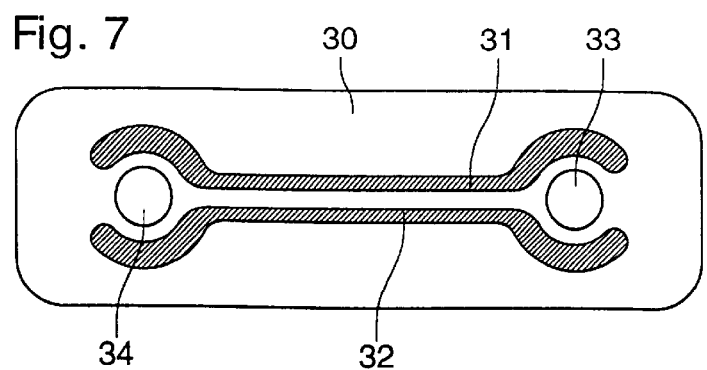
FIG. 7 shows the arrangement of the electrical connection between the two parts of the substrate of the second embodiment on a bridge.

A second embodiment, shown in FIGS. 5 to 7, includes a substrate 6, formed of two plates 61 and 62 one of which supports coil 11a and the other supports coils 11b, and 11c. In this embodiment, the adjustment is effected solely by rotating of plate 61 about an axis. Plate 62 remains fixed with respect to watch body 4.

An oblong and curved hole 23 is made in plate 61, the arc of a circle defined by hole 23 being centred on the axis of screw 12a. A screw 22 used for fixing plate 61 to screw 12a is arranged in hole 23.

A bridge 30 fixed by screws 12a and 12b is used to establish an electrical connection between two electrical strips (not shown) provided on the one hand on plate 61 and on the other hand on plate 62. Each strip 31 respectively 32 on bridge 30 has an end in the shape of an arc of a circle around holes 33 and 34 for the passage of the screws. As a result, the connection is assured when plate 61 is rotated when its position is adjusted.

Plate 62 is secured to body 4 of the clockwork movement by two screws 12 and 12b. The adjustment of the position of the stator is possible as soon as the tightening of screws 12 and 12b of the movable half stator, formed of plate 61 and coil 11a is sufficiently loose to allow said half stator to rotate. Then, said half stator rotates about screw 12a. Once the adjustment is made, screws 12 and 12a need only to be tightened to secure the stator to body 4.

As in the first embodiment, a cylindrical roller 14 rotatably mounted about an off centre axis defined by a screw 15 and pressing against substrate 61 is provided. This stop device allows the position of the moveable half stator to be adjusted simply by rotating screw 15.

In a variant of this second embodiment, the whole of the stator can be moved along an arc of a circle. If needed, several oblong and curved holes can be provided.

Of course, the invention is not limited to the above described embodiments and other embodiments, using in particular equivalent means, can be envisaged.

What is claimed is:

1. A clockwork movement fitted with a generator formed of a rotor including two flanges connected by a shaft, magnets, in even numbers, being secured to each flange, two consecutive or facing magnets having opposite polarity, this generator being further formed of a stator including one or a plurality of coils with axes parallel to that of the rotor, said coil or said plurality of coils being inserted between said two flanges fitted with magnets and being supported by a substrate, wherein at least one part of the stator including said coil or at least one coil of said plurality is fitted with means allowing it to be moved so as to make its position adjustable relative to the rotor in a plane perpendicular to the shaft of said rotor, so as to adjust the amplitude of the induced voltage across the terminals of said coil or at least one coil of said plurality when the rotor rotates.

2. A movement according to claim 1, wherein it includes means for memorising the adjustment position of said at least one stator part.

3. A movement according to claim 2, wherein means for memorising the adjustment position of said at least one stator part are formed of a roller rotatably mounted about an eccentric axis and pressing against a lateral face of said stator, said roller being associated with means for blocking its position.

4. A movement according to claim 1, wherein said at least one stator part comprises means allowing it to pivot about an axis parallel to the rotor shaft.

5. A movement according to claim 1, wherein said at least one stator part pivots about an axis and is guided by at least one screw passing through an oblong and curved hole acting as a guide for said screw.

6. A movement according to claim 1, wherein said at least one stator part comprises means allowing it to translate relative to said rotor in a plan perpendicular to its shaft.

7. A movement according to claim 6, wherein said at least one stator part comprises a plurality of oblong and rectilinear holes traversed by as many screws used as guides.

* * * * *